United States Patent [19]

Layton

[11] Patent Number: 4,550,263
[45] Date of Patent: Oct. 29, 1985

[54] WAVEFORM GENERATOR

[75] Inventor: James E. Layton, Bartlesville, Okla.

[73] Assignee: Phillips Petroleum Company, Bartlesville, Okla.

[21] Appl. No.: 576,980

[22] Filed: Feb. 3, 1984

Related U.S. Application Data

[60] Division of Ser. No. 305,291, Sep. 24, 1981, Pat. No. 4,443,713, which is a division of Ser. No. 105,041, Dec. 18, 1979, Pat. No. 4,305,274, and a continuation of Ser. No. 955,843, Oct. 30, 1978, abandoned.

[51] Int. Cl.$^4$ ............................................... H03K 4/08
[52] U.S. Cl. .................................... 307/261; 307/228; 328/158; 328/181
[58] Field of Search ...................... 307/228, 261, 260; 328/35, 36, 14, 181, 184, 185, 156–158

[56] References Cited

U.S. PATENT DOCUMENTS 3,603,809  9/1971  Uchiyama ........................... 328/35

Primary Examiner—John Zazworsky
Attorney, Agent, or Firm—French and Doescher

[57] ABSTRACT

A waveform generator is provided which is capable of generating simultaneously a plurality of electrical signals which have different waveforms. The waveform generator is completely battery operated and is particularly useful in testing multichannel devices where power is not available for standard waveform generators. A voltage regulation circuit is provided which provides a regulated voltage from a battery pack for use by the waveform generator. The forward voltage-current characteristics of the base emitter junction of a silicon transistor are used as the basis for the generation of a reference voltage for the voltage regulation circuit to thereby substantially minimize the battery drain caused by the use of a voltage regulation circuit.

2 Claims, 10 Drawing Figures

WAVEFORM GENERATOR

This application is a division of application Ser. No. 305,291, filed Sept. 24, 1981, now U.S. Pat. No. 4,443,713, which was a division of Ser. No. 105,041 filed Dec. 18, 1979, now U.S. Pat. No. 4,305,274, and a continuation of application Ser. No. 955,843, filed Oct. 30, 1978, now abandoned.

This invention relates to testing devices. In a particular aspect, this invention relates to method and apparatus for generating simultaneously a plurality of electrical signals, having different waveforms, for use in testing multichannel devices. In a more particular aspect, this invention relates to method and apparatus for generating simultaneously a plurality of electrical signals, having different waveforms, for use in testing multichannel devices where only battery power is utilized to generate the plurality of electrical signals. In another particular aspect, this invention relates to method and apparatus for providing a regulated voltage from a battery pack while substantially minimizing the power drain on the battery pack due to the use of voltage regulation circuitry. In another particular aspect this invention relates to method and apparatus for generating simultaneously a plurality of electrical signals having different waveforms and having variable frequencies so as to provide a frequency sweep of a desired frequency range.

Waveform generators are widely used for testing electrical circuits. Waveform generators are particularly useful for testing data processing channels or channels which link two devices to determine if the data processing channel is operational or to determine if the link between two devices is continuous. Many types of waveform generators are presently marketed by a number of manufacturers. However, in general, these waveform generators require an AC power source for operation.

In many cases, the data processing channel or the link which is to be tested is not readily accessible and is especially not readily accessible from the standpoint of providing AC power to a waveform generator to be utilized in testing the date processing channel or the link. This is especially true where remote devices are being utilized to acquire data with the data being transmitted then to a central location.

It is also very common to have a plurality of data processing channels in parallel in the same data acquisition device or to have a number of parallel links between two devices. It is thus desirable to be able to simultaneously generate a plurality of electrical signals, each having a different waveform, for use in testing the plurality of parallel data processing channels or the plurality of parallel links between two devices. In this manner, an indication is readily available as to exactly which one if any of the parallel data processing channels is inoperative or an indication may be provided as to which one, if any, of a plurality of parallel data links is inoperative.

Again, waveform generators are commercially available which can provide a plurality of electrical signals having different waveforms. However, in the past, waveform generators which have the capability of outputting a plurality of different waveforms have required substantial power, thus necessitating the availability of AC power to the waveform generator.

It is thus an object of this invention to provide method and apparatus for generating a plurality of electrical signals, having different waveforms, for use in testing multichannel devices where only battery power is utilized to generate the plurality of electrical signals. It is a further object of this invention to provide electrical circuitry which is capable of generating simultaneously a plurality of electrical signals, having different waveforms, using only battery power.

Because the voltage levels and frequencies of the output signals from waveform generators must be stable, voltage regulators are commonly used to insure that the voltage level of the output signals from the waveform generator is substantially stable. However, voltage regulator circuits may use a substantial amount of power. This is generally irrelevant where AC power is available but must be considered where the waveform generator is being operated only from battery power. Accordingly, it is another object of this invention to provide method and apparatus for providing a regulated voltage from a battery pack while substantially minimizing the power drain on the battery pack due to the use of voltage regulation circuitry.

It is often desirable to use a waveform generator to test a data channel which contains a notch filter or other similar device. A frequency sweep must be provided which includes the notch frequency of the notch filter to insure that the notch filter or other similar device is operational. Accordingly, it is another object of this invention to provide method and apparatus for generating simultaneously a plurality of electrical signals having different waveforms and having variable frequencies so as to provide a frequency sweep of a desired frequency range.

In accordance with the present invention, method and apparatus is provided whereby electrical circuits are utilized to generate a ramp waveform. The ramp waveform is provided as one possible input to a voltage controlled oscillator. A reference voltage source is utilized to provide a regulated output voltage from a battery pack. The regulated output voltage is provided as a second possible input to the voltage controlled oscillator.

If the ramp voltage is selected to be supplied to the voltage controlled oscillator, then the plurality of output signals from the waveform generator of the present invention will sweep in frequency. If the regulated output voltage from the reference voltage source is selected to be input to the voltage controlled oscillator, then the plurality of output voltages from the waveform generator of the present invention will have a constant frequency.

The voltage controlled oscillator provides a triangular waveform and a square waveform as outputs in response to the reference voltage input or the ramp voltage input. Both the triangular waveform and the square waveform are provided to an output network and are thus provided as two of the plurality of output signals from the waveform generator of the present invention.

Electrical circuitry is provided which shapes the triangular waveform to provide a sine waveform. The sine waveform is also provided to the output network and provides a third one of the plurality of output signals from the waveform generator of the present invention.

Electrical circuitry is also provided which shapes both the triangular waveform and the square waveform to provide a sawtooth waveform. The sawtooth waveform is provided to the output network and is utilized as the fourth of the plurality of output waveforms from the waveform generator of the present invention.

Provisions are also made in the output network of the waveform generator of the present invention to allow the sine wave to be supplied as the plurality of output signals from the waveform generator. Thus the four output signals from the waveform generator of the present invention may either be all sine waves or they may be four different waveforms.

The forward voltage-current characteristics of the base emitter junction of a silicon transistor are used as the basis for the generation of a reference voltage from the reference voltage source instead of zener voltage of a zener diode which is commonly used as a reference voltage. This results in a minimum battery drain while still providing a regulated voltage output.

Other objects and advantages of the invention will be apparent from the description of the invention and the appended claims as well as from the detailed description of the drawings in which:

Figure 1:
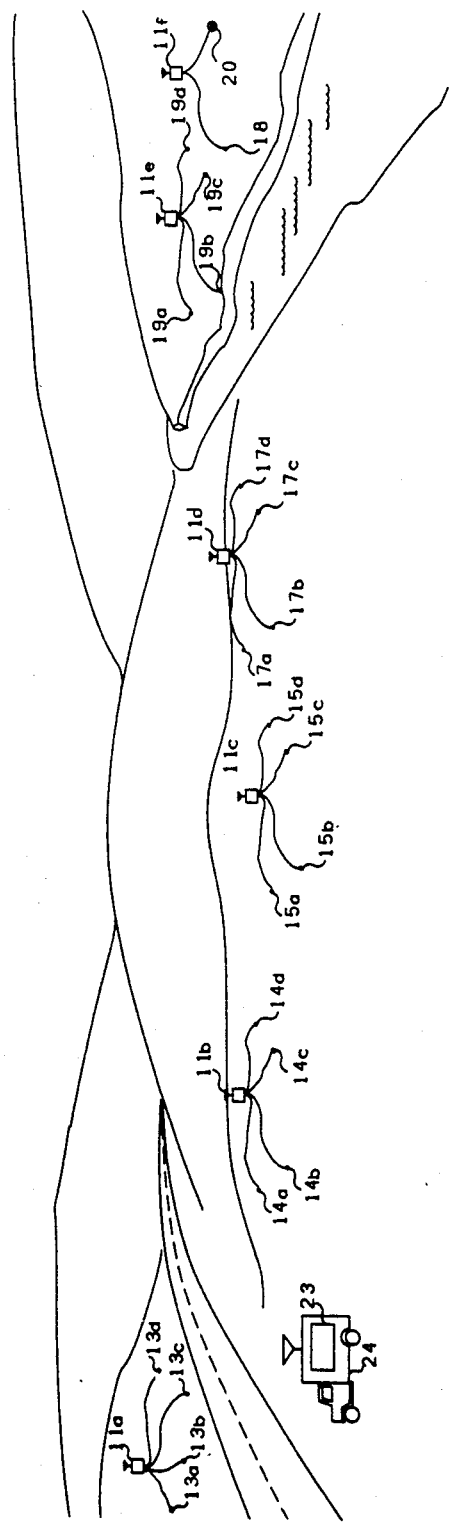
FIG. 1 is an illustration of a possible physical arrangement of the components of a seismic exploration system.
Figure 2A:
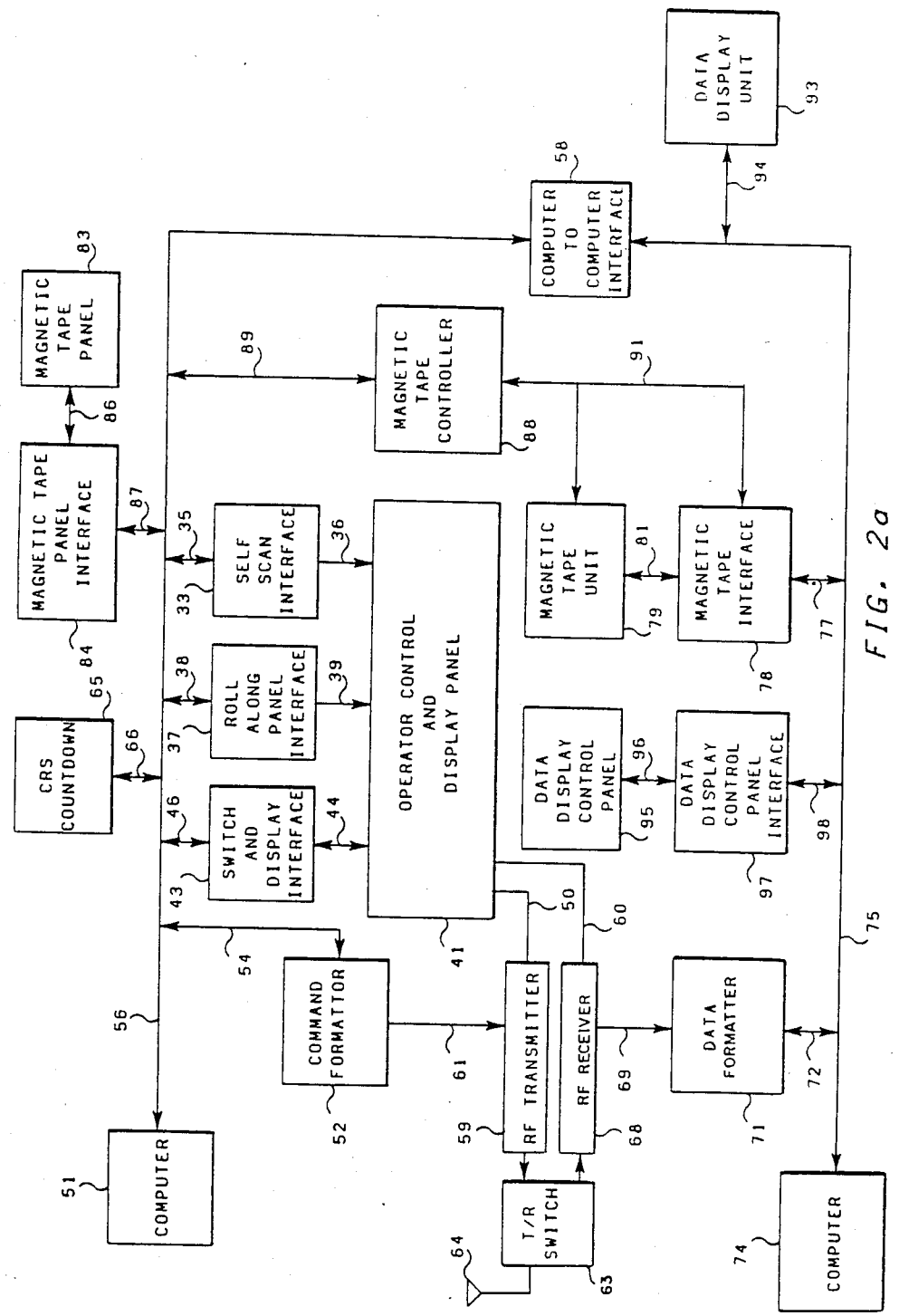
FIG. 2a is a block diagram of a central recording station.
Figure 2B:
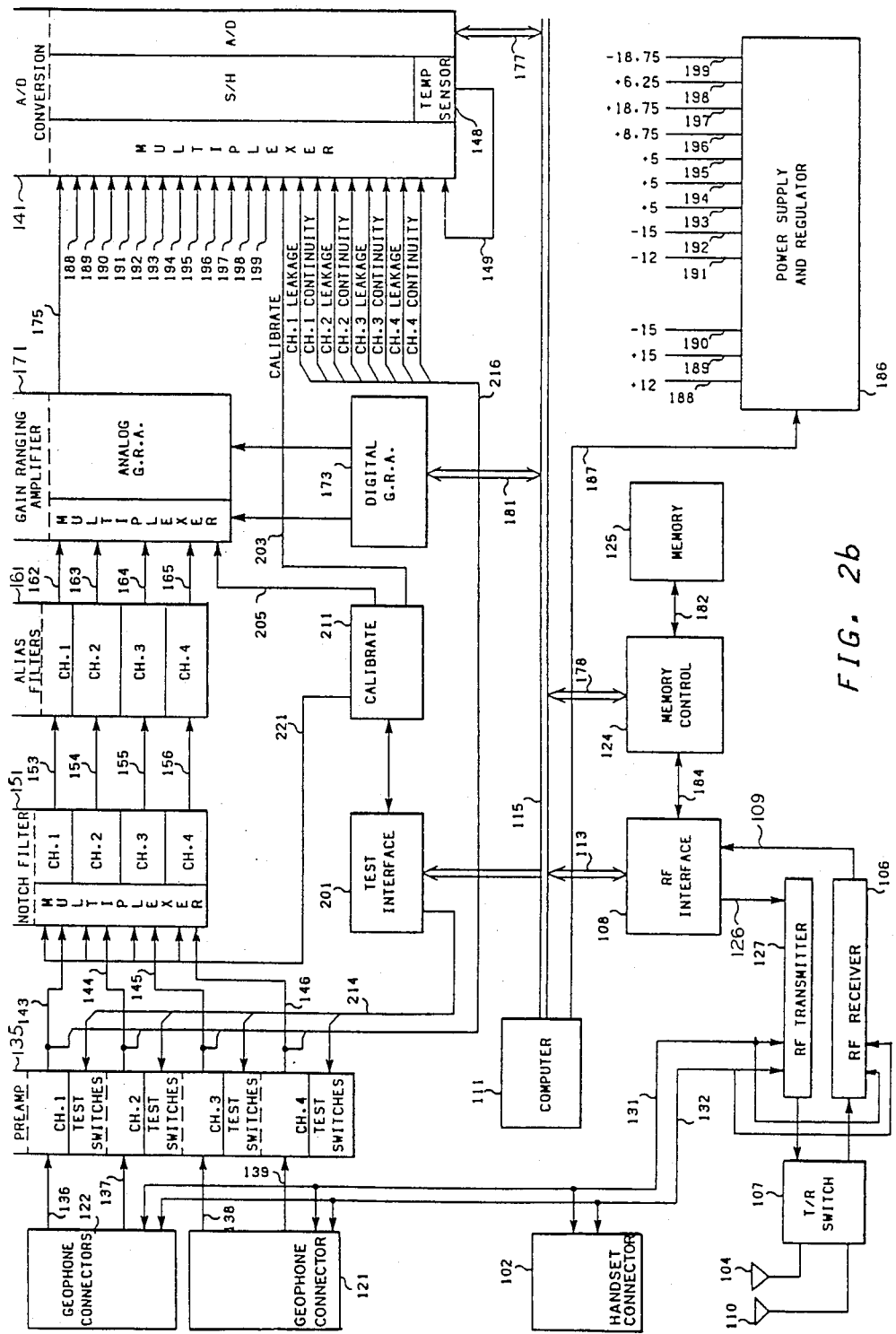
FIG. 2b is a block diagram of a remote telemetry unit.
Figure 23:
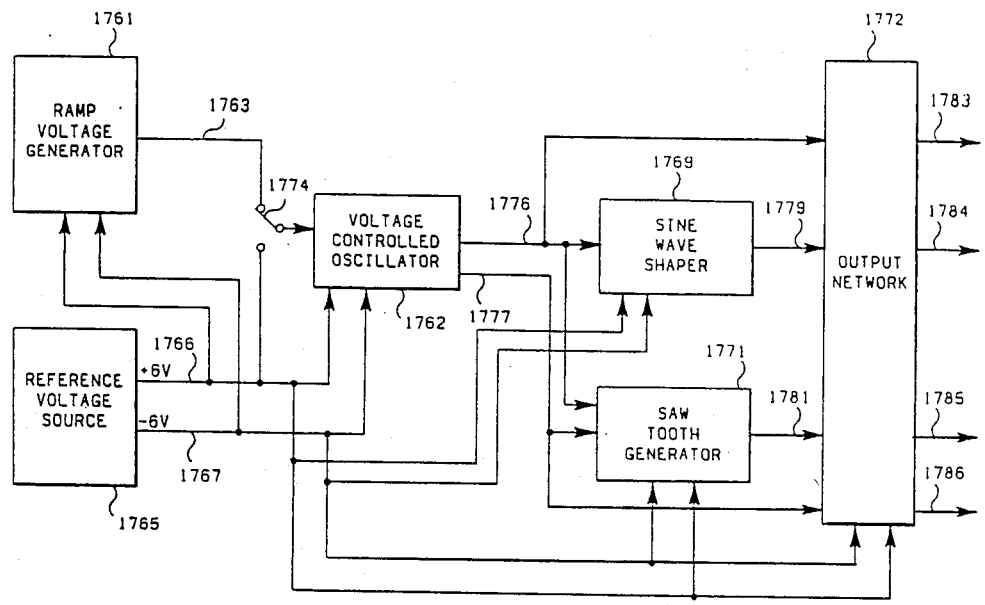
FIG. 23 is a block diagram of a separate testing unit for the remote telemetry unit illustrated in FIG. 2b.
Figure 24:
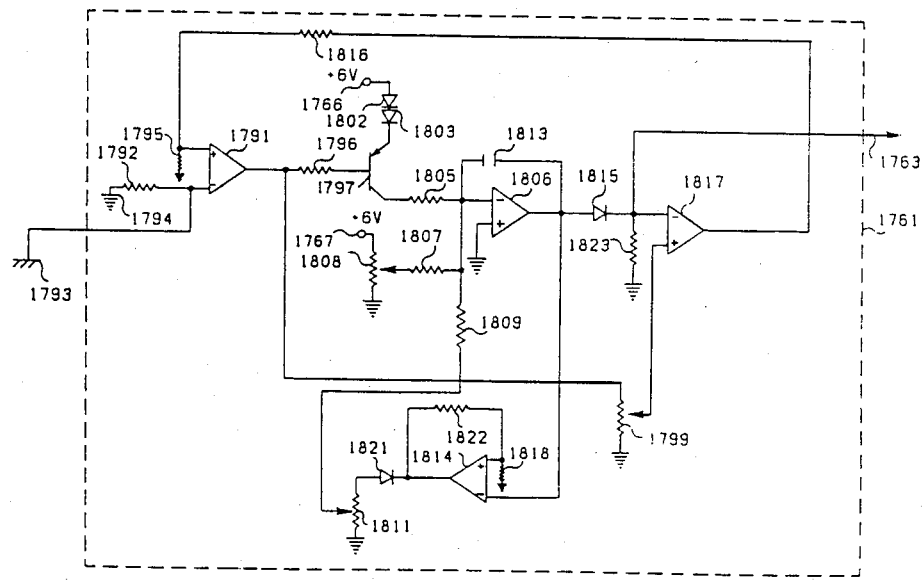
FIG. 24 is a schematic of the ramp generator illustrated in FIG. 23.
Figure 25:
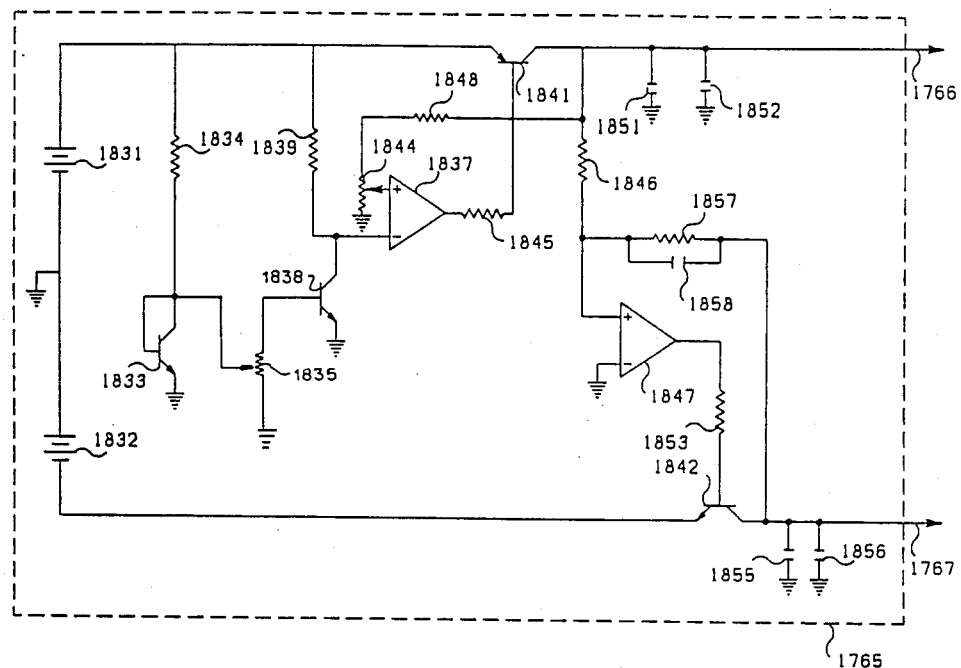
FIG. 25 is a schematic of the reference voltage source illustrated in FIG. 23.
Figure 26:
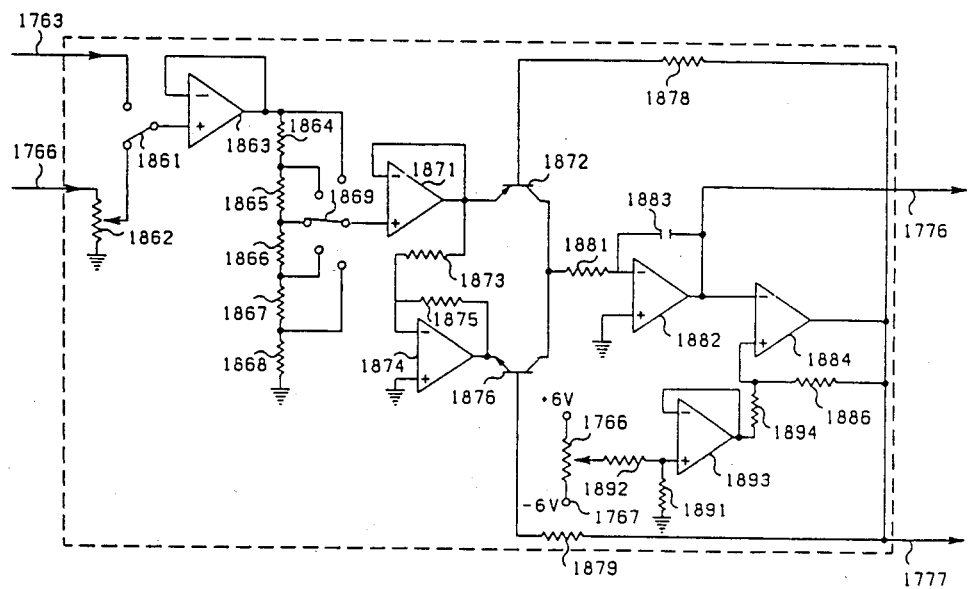
FIG. 26 is a schematic of the voltage controlled oscillator illustrated in FIG. 23.
Figure 27:
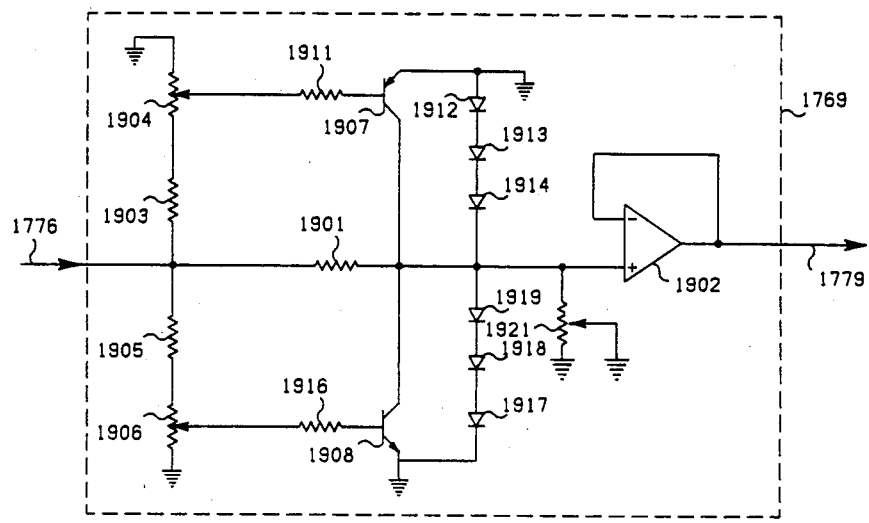
FIG. 27 is a schematic of the sine wave shaper illustrated in FIG. 23.
Figure 28:
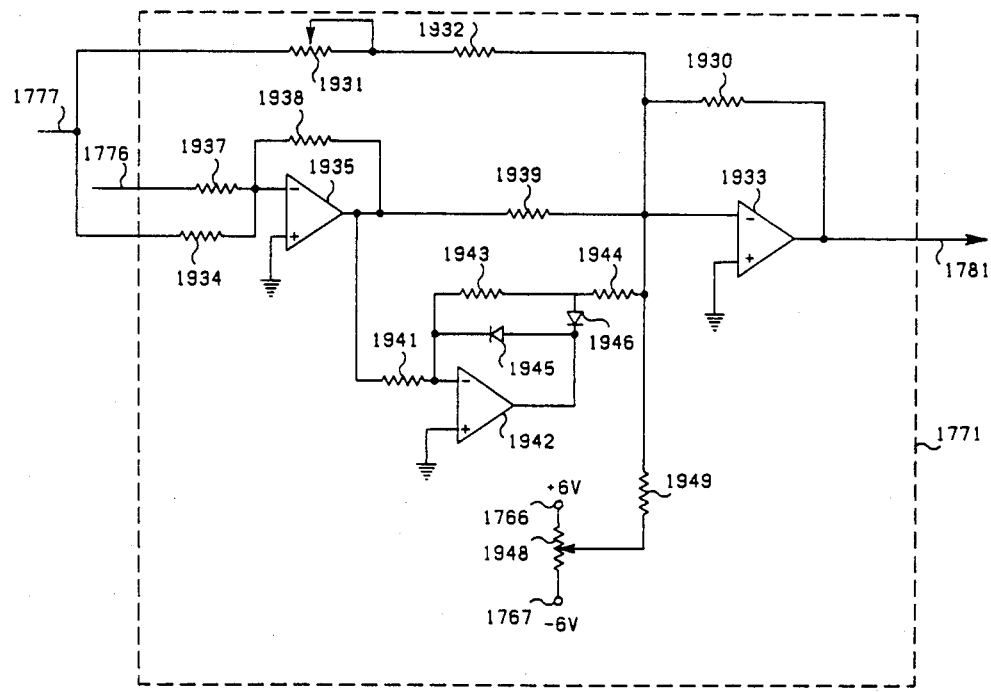
FIG. 28 is a schematic of the sawtooth generator illustrated in FIG. 23.
Figure 29:
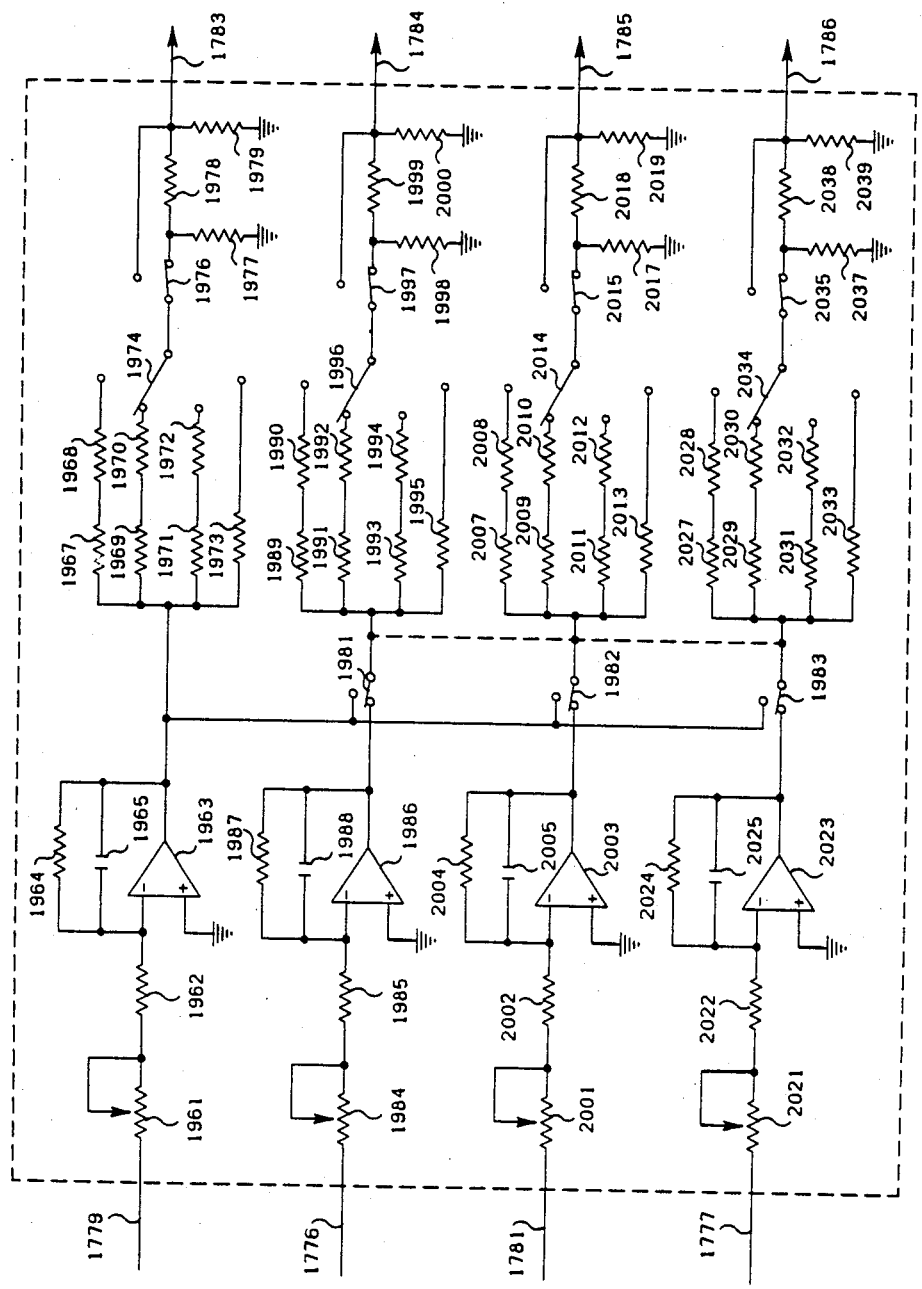
FIG. 29 is a schematic of the output network illustrated in FIG. 23.

FIGS. 3-22b and 30-73 of U.S. Pat. No. 4,257,098 are hereby incorporated by reference. The brief description of FIGS. 3-22b and 30-73 in U.S. Pat. No. 4,257,098 is also hereby incorporated by reference.

The invention is described in terms of a seismic exploration system which utilizes the waveform generator of the present invention to test the data acquisition channels of remote data acquisition units. It is, however, noted that the invention is not limited to a seismic exploration system but is rather applicable to any system in which it is desired to utilize a waveform generator which is completely battery operated to perform tests on electrical circuits. The remote data acquisition systems of the seismic exploration system each have a plurality of four data acquisition channels. Thus, the present invention utilizes four different waveforms. However, the present invention is not limited to just four different waveforms but is rather applicable to different numbers of waveforms and different types of waveforms.

Nine volt batteries are used to supply power to the waveform generator but other batteries could be utilized if desired.

The detailed description of the drawings and the Appendix of U.S. Pat. No. 4,257,098 are hereby incorporated by reference.

That which is claimed is:

1. Apparatus for generating a sawtooth waveform comprising:
    means for generating a triangular waveform;
    summing means having first and second inputs and an output;
    means for supplying said triangular waveform to said first input of said summing means;
    means for supplying said square waveform to said second input of said summing means;
    a full wave rectifier means having first and second inputs and an output;
    means for supplying the output of said summing means, representative of the summation of said triangular waveform and said square waveform, to said first input of said full wave rectifier means; and
    means for supplying said space waveform to said second input of said full wave rectifier means, said sawtooth waveform being supplied from the output of said full wave rectifier means.

2. A method for transforming a triangular waveform and a square waveform into a sawtooth waveform comprising the steps of:
    summing said triangular waveform and said square waveform to thereby generate a first signal;
    supplying said first signal to a first input of a full wave rectifier means; and
    supplying said square waveform to a second input of said full wave rectifier means, said sawtooth waveform being supplied from the output of said full wave rectifier means.

* * * * *

UNITED STATES PATENT AND TRADEMARK OFFICE
CERTIFICATE OF CORRECTION

PATENT NO. : 4,550,263

DATED : October 29, 1985

INVENTOR(S) : James E. Layton

It is certified that error appears in the above-identified patent and that said Letters Patent are hereby corrected as shown below:

Claim 1, line 35 "space" should be ---square---.

Signed and Sealed this

First Day of April 1986

[SEAL]

Attest:

Attesting Officer

DONALD J. QUIGG

Commissioner of Patents and Trademarks